United States Patent

[11] 3,614,242

| [72] | Inventor | Jiri Hrdina |
| | | Praha, Czechoslovakia |
| [21] | Appl. No. | 37,364 |
| [22] | Filed | May 6, 1970 |
| [45] | Patented | Oct. 19, 1971 |
| [73] | Assignee | Ceskoslovenska akademie ved |
| | | Praha, Czechoslovakia |
| | | Continuation of application Ser. No. |
| | | 584,451, Oct. 25, 1966. |

[54] PHOTOELECTRIC PHOTOMETER
6 Claims, 5 Drawing Figs.

[52] U.S. Cl. .................................................. 356/181,
250/218, 356/246
[51] Int. Cl. ...................................................... G01j 3/46
[50] Field of Search............................................ 356/103.4,
181–185, 207, 208, 244, 246; 250/218

[56]     References Cited
UNITED STATES PATENTS

| 2,547,212 | 4/1951 | Jamison et al. ............... | 250/218 X |
| 3,170,068 | 2/1965 | Petriw et al. .................. | 356/103 |
| 3,236,602 | 2/1966 | Isreeli........................... | 250/218 X |
| 3,319,512 | 5/1967 | Isreeli........................... | 250/218 X |
| 3,333,107 | 7/1967 | Hubbard et al. ............... | 356/246 X |
| 3,289,527 | 12/1966 | Gilford et al.................. | 356/246 |

FOREIGN PATENTS

| 1,153,187 | 8/1963 | Germany...................... | 356/208 |

Primary Examiner—Ronald L. Wibert
Assistant Examiner—R. J. Webster
Attorney—Paul H. Smolka ABSTRACT: A flow-through measuring cell is used on combination with an optical system which passes through the cell a light beam restricted to the central or core portion of the cell.

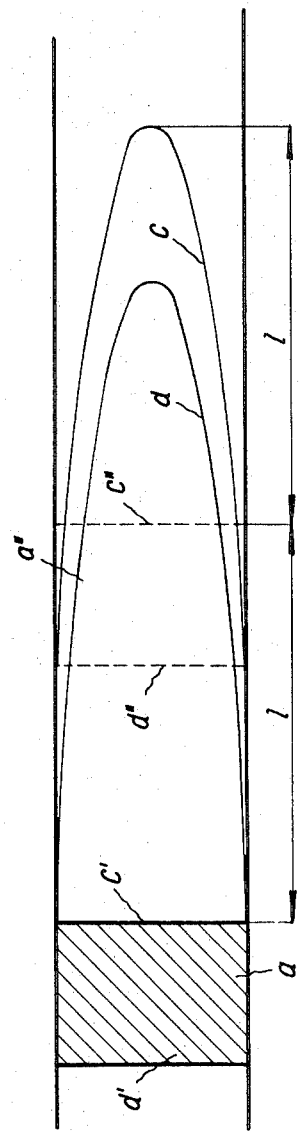
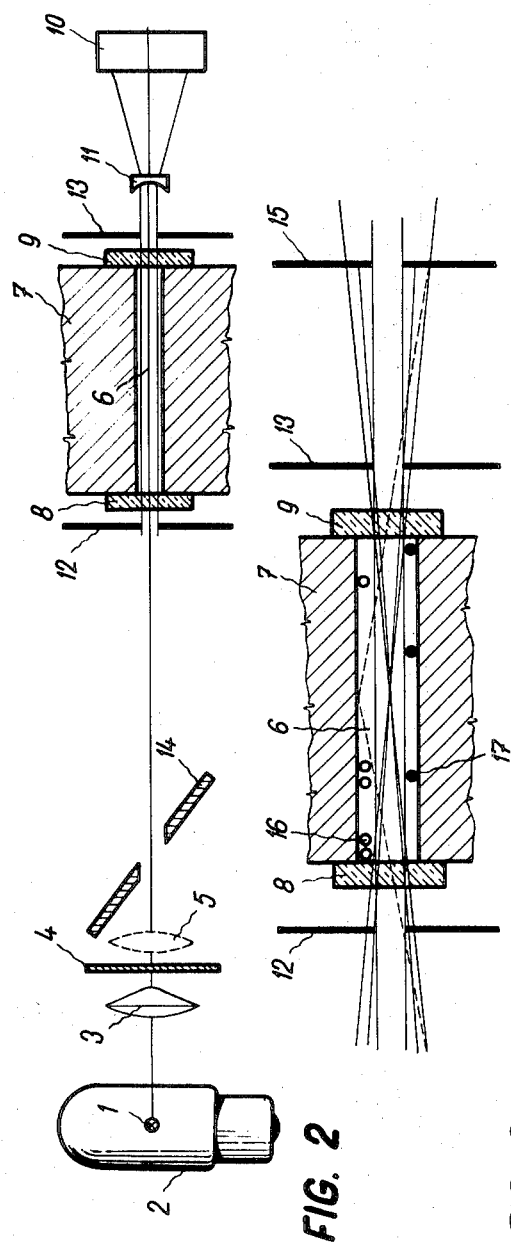
FIG. 1
FIG. 2
FIG. 3
INVENTOR.
JIRI HRDINA

PHOTOELECTRIC PHOTOMETER

This case is a continuation of Ser. No. 589,451, filed Oct. 25, 1966.

My invention relates to a photoelectric photometering device for use in calorimetric analysis and includes a flow-through measuring cell through which light rays pass at least approximately in the same direction as the liquid to be analyzed.

Flow-through measuring cells are subjected to the unfavorable effects of the Poiseuille law, particularly in cases where violent concentration changes of short duration are involved; this occurs at an increasing rate even in very effective modern installations, for example, in automatic devices for analyzing mixtures of amino acids and similar materials. In modern arrangements of columns it is possible to achieve such a degree of the selectivity of the separation that the dispersion caused by the column itself is of an order approximately equal to the dispersion caused by the flow of the liquid through the photometric cell proper, particularly if no provisions are made in the design of the cell to suppress this phenomenon.

Figure 1A:
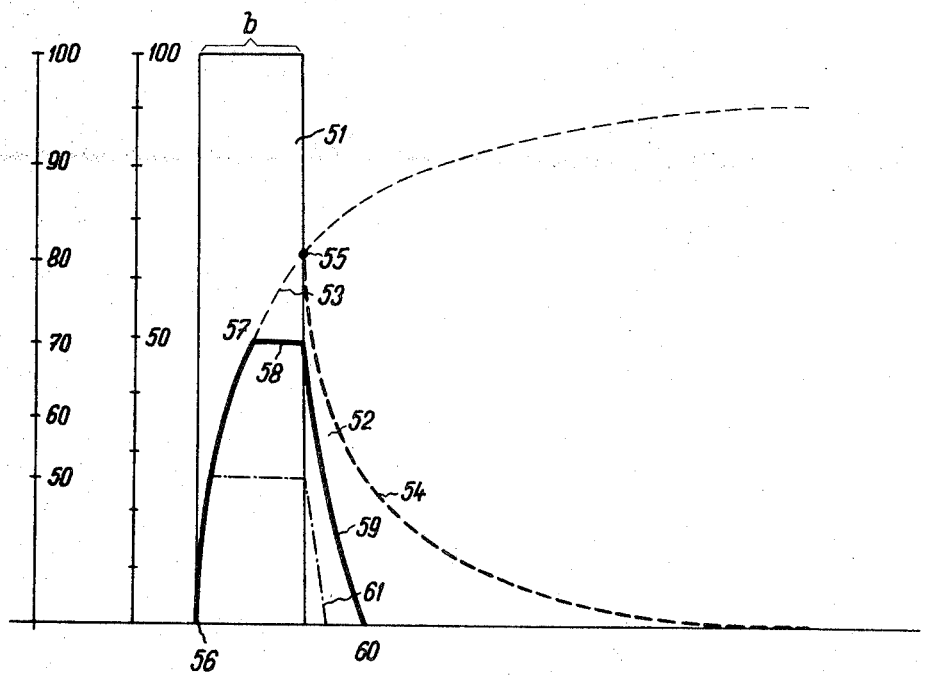
Figure 1B:
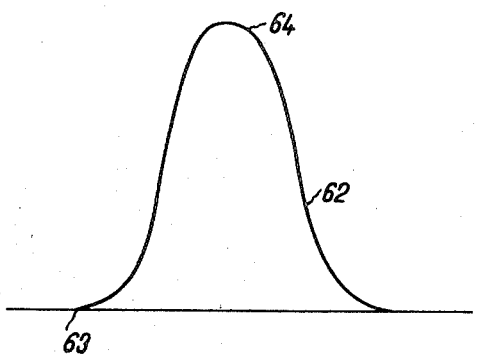

FIGS. 1, 1a and 1b of the accompanying drawing explain the premises on which my invention is based. In the case of a laminar flow through a tubing, and hence also through a measuring cell, diagrammatically explained in FIG. 1, and in consequence of the Poiseuille law, the shaded portion $a$ of the liquid is deformed to be bounded by two paraboloidal areas $c$, and $d$ resulting during the flow of the liquid from the plane areas $c'$ and $d'$ which originally limited the section $a$. Accordingly, the portion $a$ does not move in a certain interval into the position $a''$ limited by the areas $c''$, $d''$, indicated by the dotted lines but moves into the space bounded by the paraboloidal areas $c$ and $d$. As this occurs the apexes of the individual paraboloids move at a speed which is twice the speed corresponding to the average flow speed, while the circular contacting lines between said paraboloids and the inner walls of a cylindrical tube remain at rest. Consequently, the said paraboloids lengthen continuously as long as the laws of laminar flow maintain and as long as deformations are neglected which are caused by diffusion and other secondary phenomena. Therefore, when in the cell a demarcation between a colorless liquid and a colored liquid appears a colored paraboloid forms in the cell which passes gradually through the entire cell as an extending central filament. It will be understood that considerable systematical errors will necessarily arise if the average extinction is measured over the entire area of the cell through which light passes disregarding whether this area is a longitudinal cell, or whether it is assumed that the average measured absorbing power corresponds to the average concentration of a photometrically measured material.

Figure 1 shows that one undesirable effect of the said parabolization is, for example, that a short pulse $a$ originally restricted by the plane areas $c'$ and $d'$ which are perpendicular to the direction of flow of the liquid becomes deformed into a rotational body bounded by coaxial paraboloids $c$ and $d$ which extend gradually into the space of the cell. This means that even in a short longitudinal cell the shape of the photometric response or expression becomes deformed as illustrated in Figure 1a, wherein the original pulse $a$ is indicated by the rectangle 51 having the width $b$. Due to the said parabolization a photometric expression is produced having the shape of the area 52 confined between the two hyperbolic curves 53 and 54. Extensions of these two curves approach the final or zero value asymptotically, that is only after an infinitely long time. In the first curve 53 this effect does practically not appear because it is sharply intersected by the similar second curve 54 joining the first curve at the point 55 which forms the apex of an areal configuration whose area equals the area of the rectangle 51, the bordering second curve 54 of which approaches the zero value asymptotically. The ordinates of this second curve 54 are given by the difference of the ordinates of the curve 53 and of a similar not illustrated curve shifted to the right by the width $b$ of the pulse $a$. It is apparent that the asymptotical approach of curve 54 to zero value is undesirable because the photometer thus considerably degrades the division achieved for example by a chromatographic column. An accurately rectangular pulse 51 is never involved but a bounded as shown in FIG. 1b by a curve 62 which is more or less bell shaped like a Gaussian curve indicating the normal distribution of random errors. The starting and the terminal curvature of this curve 62 at the zero line 63 and at its apex 64 causes the photometrically deformed pulse 51 to differ from the pulse bounded by the curves 53 and 54 so that instead of having sharp bends at the points 56 and 55 the curve is rounded.

If by means of screening means such as aperture plates used in accordance with this invention, as will be later fully described, the effective transverse optical profile is limited for example to 50 percent of the entire cross section of the area (this corresponding to a screen radius equal to approximately 70 percent of the radius of the diameter of the cell) an area is obtained as photometric expression which is restricted on the left by the same curve 53 as in the preceding case, but this curve will end at the point 57 as the limit of the photometrically efficient area where it will be replaced by a horizontal substantially linear portion 58 which passes at the point corresponding to the width of the original pulse 51 into the dropping hyperboloidal arc 59 sharply crossing at the point 60 the basic line. It can be seen that by applying screening means one obtains here as the photometric expression an area whose sharp apex is replaced by a horizontal linear portion 58 and such area eliminates degrading caused by the asymptotic termination of the curve 54 toward the basic line with all undesirable consequences for clear separation of the various components of the analyzed mixture. A pulse restricted by arcs not smoothly passing into each other corresponds again to the theoretical case of the original rectangular pulse 51 when secondary phenomena such as diffusion and the like are neglected.

In the case of the actually occurring pulses of a shape shown in Figure 1b the sharp corners of the curve restricting the resulting pulse 61 shown in Figure 1a are of course rounded. The undesirable contribution of the cell worsening the separation is here substantially reduced not only by removing the terminal part of the curve 54, but also by the flattening 58 replacing the sharp apex 55. The flattening 58, possibly combined with a rounding off in view of the bell shape according to Figure 1b, is in any case considerably more stable against random effects than the sharp corner 55 or the arc replacing the same. When evaluating the results it is namely important to determine the height of the photometrically ascertained pulse with the possibly greatest independence from random effects which are difficult to control. Such independence is in the case of said flattened border line 58 substantially greater than in the case without such flattened line caused by said means.

Figure 1a shows on the left a linear scale corresponding to the percentage ratio between the optically active part of the cross-sectional area and the area of the entire profile, and also a scale of the percentage ratio of the corresponding radii. The dot-and-dash line in Figure 1a shows the case where the optically active space of the cell is reduced by screening means having an aperture or other light rays permeable area of a radius equal to 50 percent of the cell radius, that is where the active area of the optical space of the cell is reduced to 25 percent. It is obvious that by the mentioned reduction in the diameter of the aperture or the like one can arrive from the original shape of the pulse 52, which is limited by paraboloidal curves 53, 54 intersecting each other sharply at the point 55, to photometric expressions which are substantially more similar to the basic rectangular pulse 51, where particularly the dying out of the photometric expression at the rear border of the pulse $b$ is enormously reduced from the originally infinitely long dying out. Thus, by reducing the diameter of aperture or the like in the screening, the rectangular shape 51 of the original pulse can be closely approached except the scale of the ordinates which, though also reduced, can however, be compensated by increasing the sensitivity of the employed evaluation method.

The exploitation of the results obtained by using screening means in accordance with this invention for the photometric reaction of the photometer during the flow of a pulse therethrough is an important improvement in comparison with presently conventional cells and photometers in that it may be unnecessary to homogenize the cell space what otherwise is essential as a means for removing undesirable effects of the described parabolization in the case of exacting and exact measurements.

From the foregoing it will be understood that it is necessary either to perfectly mix the content of the cell over its entire range, or at least that content through which the measuring light beam passes, or to restrict oneself to the longitudinally extending central part of the cell where the errors resulting from the mentioned phenomenon are substantially smaller than in the border parts.

Mixing over the entire range of the cell through which the active light beam passes is rather difficult, and it can be satisfactorily carried out only when using special mixing devices comprising means which are the object of a copending patent application. A certain improvement can be achieved by mixing at least a part of the content of the cell by using swirling phenomena which can be produced by a suitable entry of the measured liquid into the space of the cell. This, too, is the object of a pending patent application.

The invention makes use of the fact that it is possible to reduce substantially the interfering effect of the above mentioned phenomenon by restricting the active photometric beam to the central part of the cell, either of the transverse type, and more particularly of the longitudinal type. In the case of longitudinal cells there arises the increased danger of interfering phenomena resulting from the existence of particles which stick in the cell or travel therethrough. These interfering particles may be either very small bubbles or drops of unmixable liquids, or flakes, lumps and the like. In a horizontally or obliquely arranged longitudinal flow-through cell (an obliquely arranged cell is the object of another copending patent application), these particles generally travel along the highest or lowest places of the various transverse sections of the cell according to whether the specific weight of these particles is smaller or larger than the specific weight of the photometered liquid. These particles can stick to the walls of the cell either permanently or temporarily. Removal of their interfering effect can be achieved by the same practical means by which the interfering effects resulting from distortion of the flow cross sections are removed, as previously explained in detail in the introductory part of this specification.

The main feature of the photometering device in accordance with my invention resides therein that the active beam which after having passed through the content of the cell reaches the light sensitive photometer member, is restricted in such a manner that for the photometric effect only its central part is utilized which part is sufficiently distanced from the walls of the cell so that no rays of the light beam reach either the wall, or the particles sticking thereto, or moving therealong. From the beam which after passing the cell reaches the light sensitive member of the photometer, all rays are eliminated which pass through the cell at a smaller distance from their walls than corresponds to the magnitude of the particles which can stick to the wall of the cell, or travel therealong. Only rays of the beam which have passed through the central part of the cell are utilized; in this central part the fundamental errors of the photometric evaluation are substantially smaller than in the peripheral parts which in the arrangement of the photometer in accordance with this invention are eliminated from receiving and transmitting active light rays impinging on the light sensitive member of the photometer.

Having explained the principles on which my invention is based and having indicated the objects of my invention, the same will be more fully understood from the following specification when read with the accompanying drawing in which FIGS. 1, 1a and 1b referred to above indicate diametrically the said basic principles underlying the invention;

FIG. 2 illustrates schematically an exemplary arrangement of the photometer having a longitudinal cell in accordance with the invention; and FIG. 3 shows an enlarged section through the cell with screening means showing the path of the rays.

In accordance with FIG. 2, the light rays radiated from the incandescent small filament 1 of the lamp 2 are transformed by the optical member 3 into a beam approximately parallel rays through the interference filter 4 and thereafter by a further optical member 5 are converged to create an actual picture of the incandescent filament 1 approximately in the center of the functional space 6 in the body of the cell 7. The converging rays enter the space 6 of the cell 7 through a transparent admission window 8 and leave the space 6 through the transparent outlet window 9. Before impunging on the photoelectric member 10, they may pass through an optical dispersion member 11. Rays which do not meet the above mentioned requirements of free passage only into and through the cross-sectional central portion of the space 6 of cell 7 are intercepted by at least one of the screening members 12, 13 and, if necessary, by one or more additional such screening means placed at a certain distance from said screening members 12, 13.

As shown in FIG. 2, the pencil of rays emanating from filament 1 is further restricted by a screening member 14, for example the shown aperture plate, which, like members 12, 13 permits light rays to pass only through its central part thereby restricting the width of the pencil of rays advancing to the cell 7. The screening member 14 can even reflect with its border portions the peripheral light rays to a photoelectric reference member which is the object of a copending patent application.

FIG. 3 shows an enlarged cross-sectional diagrammatic view of the cell 7 with screening members such as aperture plates 12, 13 and an additional screening member 15. The members 12 and 13 have passage opening of a smaller inner diameter than that of the functional space 6 of the cell 7. The upper part of the functional space 6 shows circles 16 indicating gas bubbles or lighter particles, and the dots 17 in the lower part of the functional space 6 indicate impurities at the bottom of the space 6. If the reflection from the inner walls of the space 6 and eventually also from the said particles 16 and 17 is neglected it would be sufficient to so limit the pencil of rays by the screening members 12 and 13 that no rays passing through the members 12, 13 hit any of the said particles 16, 17. By further reducing the light permeable opening in the members 12, 13 it is possible to utilize exclusively only that portion of the space 6 which lies still closer to its longitudinal central axis. The respective peripheral rays which enclose the passing beam (neglecting small directional deviations connected with the refraction of the rays on the boundary of the various media) are shown in FIG. 3 by full lines. The dotted line indicates by way of example a ray which after reflection on the upper wall of the functional space 6 leaves through the opening of the screening member 13. Such ray which could affect the stability of the photometric evaluation is intercepted by one or more screening members 15 located at a suitable distance from the member 13. Interception of such rays reflected from the walls is desirable because it is difficult to ensure that reflection on the internal walls of the functional space 6 maintains a constant value; this is so because during such reflection of rays, the particles sticking to the inner walls of the cell or moving therealong come into play in an undesirable manner.

Referring to FIGS. 2 and 3 it should be added that it may be possible to combine the screening members 12 and 14, particularly member 12, with the window 8 and the screening members 13 and 15, particularly the member 13, with the window 9. In such case said windows should be made of an opaque material and provided with a central light permeable portion having a diameter smaller than that of the extinction space 6 so that light rays will be permitted to enter only the core portion of the liquid flow.

Although only one embodiment of my invention has been shown and described to illustrate the application of the principles thereof, it will be understood that it may be otherwise embodied without departing from such principles.

What I claim as my invention is:

1. Apparatus for colorimetric analysis of liquids under laminar flow conditions with boundaries between successive liquids in the flow cell being deformed into paraboloidal shapes due to the flow, said apparatus comprising a source of light and a photoelectric detector having a common light path therebetween;

a flow cell positioned along said light path for receiving light from said source, said cell having internal walls for conducting a stream of liquid parallel to said light path and having transparent windows on opposite ends, the transparent windows being in a position substantially perpendicular to said light path;

a first screening means between the flow cell and the source of light;

a second screening means between the flow cell and the photoelectric device, each of said screening means having an opening in alignment with the axis of the flow cell and said light path, both of said openings being smaller than the cross-sectional area of the flow cell through which the liquid flows and having a size corresponding to the cross-sectional area of the apex of the paraboloidal boundaries of the liquid samples;

optical means between said source of light and said first screening means, said optical means cooperating with said first and second screening means to collimate the light in said path and to restrict said path from intersecting the internal walls of said flow cell;

whereby only the path of light passing through the restricted portion of the cross-sectional area of the flow cell is allowed to impinge on the photoelectric detector.

2. Apparatus according to claim 1 where the second screening means comprise two screening members having a common axis and arranged with a space therebetween.

3. Apparatus according to claim 1 wherein said screening means are operative to limit the cross-sectional area of said light beam to approximately 50 percent of the said cross-sectional area of said flow cell.

4. A method for conducting colorimetric analysis comprising conducting a stream of liquid having alternating segments of colorless liquid and colored liquid through an enclosed flow cell having opposite transparent walls and longitudinal internal walls, said stream of liquid being conducted through the flow cell under laminar flow conditions to produce parabolic boundaries between liquid samples, said boundaries extending longitudinally of the flow cell; screening light from said light source on opposite ends of the flow cell to a size corresponding to the central area surrounding the apex of the paraboloidal boundaries between liquid samples to prevent light rays from passing in close proximity to the interior walls of the flow cell; directing a beam of collimated light longitudinally through said flow cell while preventing said light from impinging on said longitudinal walls; and detecting the intensity of said light beam passing through said colored liquid by impinging said beam on a photometric responsive device.

5. The method for conducting colorimetric analysis according to claim 4 wherein said screening blocks the transmission of light from said light source which is more greatly dispersed than about 50 percent of the cross-sectional area of said flow cell, said area being concentric with the longitudinal central axis of the flow cell.

6. Apparatus for colorimetric analysis of viscous liquids, said apparatus comprising:
   a. a flow cell having internal walls arranged to form an elongated flow passage having a central axis, liquid samples flowing longitudinally in said passage under laminar flow conditions having paraboloidal boundaries concentric with said central axis,
   b. transparent end walls positioned transversely to the internal walls;
   c. a source of light positioned to transmit a beam of light rays through each of said transparent walls and through said passage in a direction substantially parallel to the internal walls;
   d. collimating means for forming said rays of light into a group of substantially parallel rays in said beam before they pass through the first transparent wall;
   e. first screening means positioned between the source of light and the first transparent wall said screening means having a rim defining a hole therein;
   f. a photometric device response to intensity of the light which passes through the flow cell;
   g. second screening means positioned between the second transparent wall and the photometric device, said second screening means having therein a rim defining a second hole, said rims of said first and second screening means being in alignment with said central axis, said first and second holes having a diameter corresponding to the cross-sectional area of the apex of said paraboloidal boundaries.